United States Patent [19] [11] 4,282,336
Yonezawa et al. [45] Aug. 4, 1981

[54] CURABLE DIALLYL PHTHALATE COMPOUNDS AND PROCESS FOR PRODUCING SAME

[75] Inventors: Kazuya Yonezawa; Hisao Furukawa; Masaaki Azuma, all of Kobe, Japan

[73] Assignee: Kanegafuchi Kagaku Kogyo Kabushiki Kaisha, Osaka, Japan

[21] Appl. No.: 1,853

[22] Filed: Jan. 8, 1979

Related U.S. Application Data

[62] Division of Ser. No. 936,378, Aug. 24, 1978, Pat. No. 4,161,572.

[30] Foreign Application Priority Data

Aug. 29, 1977 [JP] Japan .................. 52/103902

[51] Int. Cl.$^3$ .......................... C07F 7/02; C08F 8/42; C08F 8/18; C08F 8/32
[52] U.S. Cl. .................. 525/102; 525/100; 525/105; 526/323; 556/410; 556/442
[58] Field of Search ............ 525/102, 105, 100; 526/323; 556/410, 442

[56] References Cited

U.S. PATENT DOCUMENTS

| | | | |
|---|---|---|---|
| 2,723,987 | 11/1955 | Speier | 260/448.2 |
| 2,970,150 | 1/1961 | Bailey | 260/448.2 H |
| 3,296,196 | 1/1967 | Lamoreaux | 260/448.2 B |
| 3,503,943 | 3/1970 | Kresge et al. | 260/80.78 |
| 4,161,572 | 7/1979 | Yonezawa et al. | 525/100 |
| 4,191,713 | 3/1980 | Yonezawa et al. | 525/102 |
| 4,191,714 | 3/1980 | Yonezawa et al. | 525/102 |

FOREIGN PATENT DOCUMENTS 1090328 11/1967 United Kingdom ................ 525/105

Primary Examiner—William F. Hamrock
Attorney, Agent, or Firm—Moonray Kojima

[57] ABSTRACT

Diallyl Phthalate compounds having a molecular weight of 250 to 20,000 and having at least one silyl group represented by the formula:

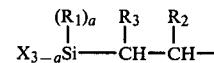

wherein $R_1$, $R_2$ and $R_3$ are each a hydrogen or a monovalent hydrocarbon radicals having 1 to 10 carbon atoms, such as alkyl, aryl or aralkyl radicals; X is a group selected from halogen, alkoxy, acryloxy, aminoxy, phenoxy, thioalkoxy and amino groups, and "a" is an integer 0, 1 or 2, in the molecule; and process for producing same wherein a diallyl phthalate monomer or prepolymer having molecular weight of 20,000 or less is reacted with a hydrosilane compound having the formula:

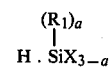

wherein the designations are the same as above, and at a temperature within the range of 50° to 150° C.

1 Claim, 2 Drawing Figures

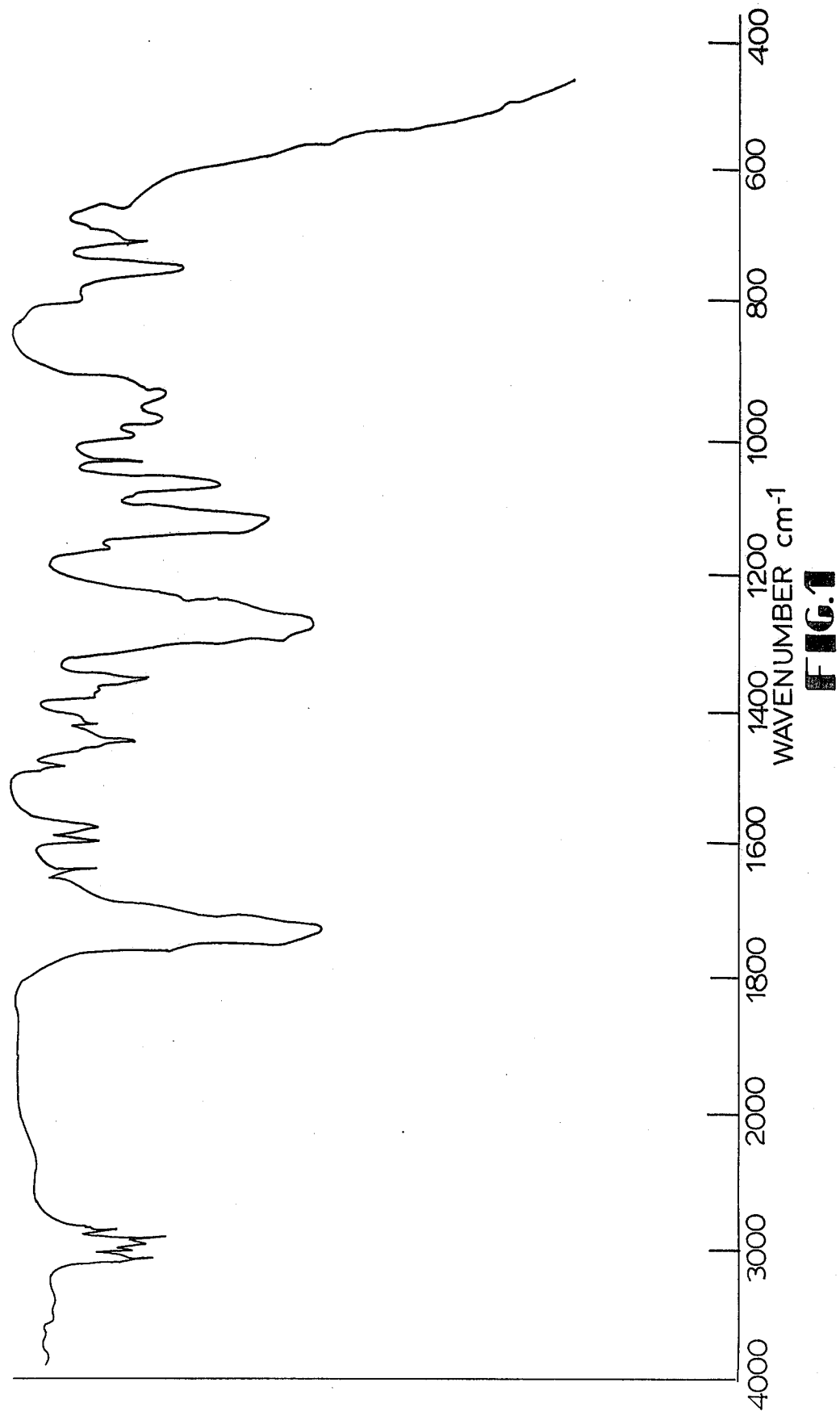

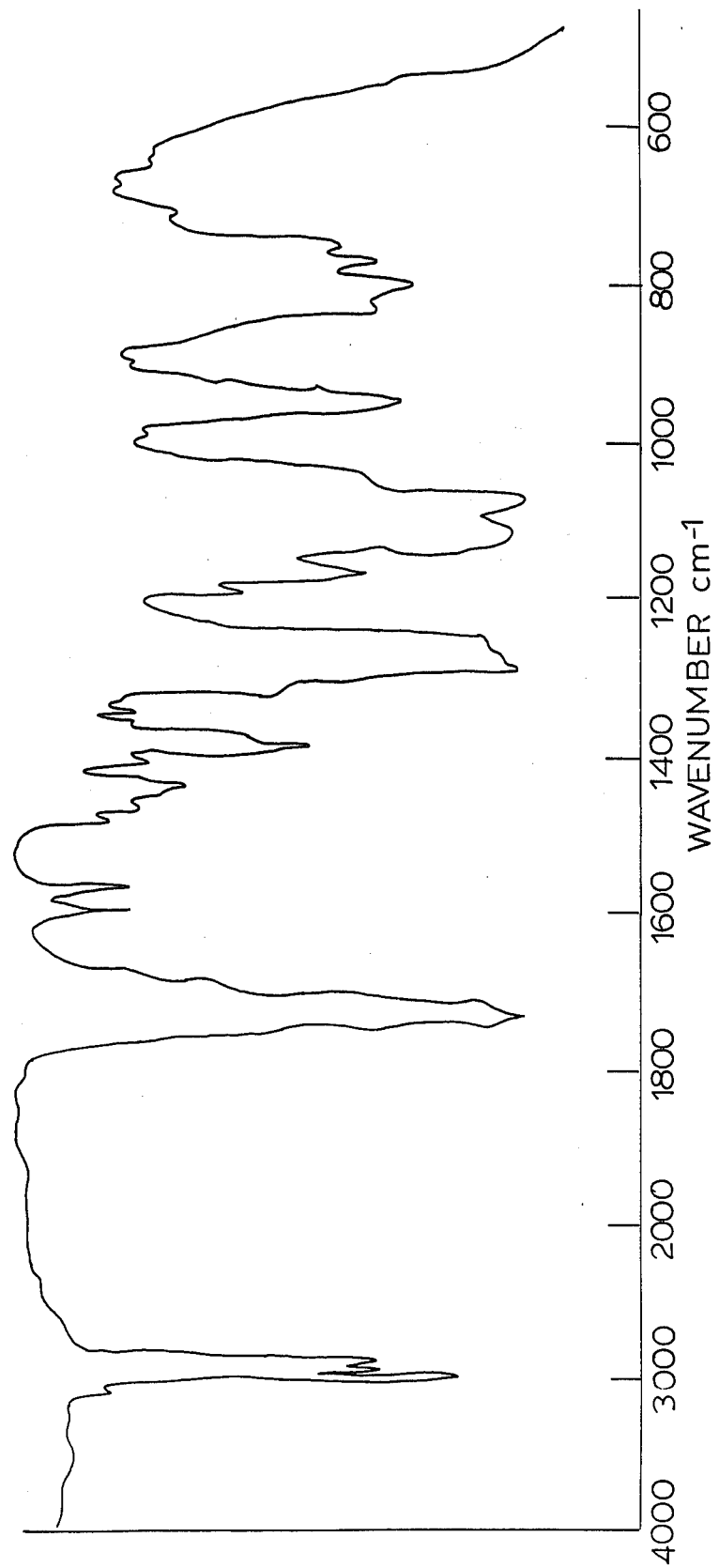

CURABLE DIALLYL PHTHALATE COMPOUNDS AND PROCESS FOR PRODUCING SAME

This is a division, of application Ser. No. 936,378, filed Aug. 24, 1978, now U.S. Pat. No. 4,161,572

BACKGROUND AND SUMMARY OF THE INVENTION

This invention relates to a novel diallyl phthalate compound; a process for producing same and adhesives and paint or coatings comprised of said compounds.

The novel diallyl phthalate compound is curable upon exposure to moisture in the atmosphere and hardenable thereby.

The invention encompasses diallyl phthalate type compounds having molecular weight of 250 to 20,000 and having at least one silyl group represented by the formula:

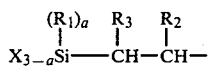

wherein $R_1$, $R_2$ and $R_3$ are each a hydrogen or a monovalent hydrocarbon radical having 1 to 10 carbon atoms, such as alkyl, aryl or aralkyl radicals; X is a group selected from the group consisting of halogen, alkoxy, acyloxy, aminoxy, phenoxy, thioalkoxy and amino groups; and "a" is an integer 0, 1 or 2; in the molecule.

In the prior art, although diallyl phthalate monomers and diallyl phthalate prepolymers have been used in large quantities as thermosetting resins, diallyl phthalate containing silyl group type hardening compounds as used in the present invention, have not been known.

BRIEF DESCRIPTION OF DRAWING

FIG. 1. depicts an infrared absorption spectrum of diallyl phthalate, and

FIG. 2 depicts an infrared absorption spectrum of silyl group containing diallyl phthalate resin.

DETAILED DESCRIPTION OF PREFERRED EMBODIMENTS

This invention relates to diallyl phthalate monomers or prepolymers having silyl groups in the terminals or side chains. The monomers or prepolymers have the characteristic of thermosetting type diallyl phthalate resins and have remarkably improved adherence properties. Moreover, the inventive monomers and prepolymers are capable of hardening at room temperature upon exposure to water, and more particularly, by exposure to moisture in the atmosphere. Thus, a wide range of applications is possible with the present invention.

The silyl group containing diallyl phthalate type hardening compounds are novel. The structure of the compounds and the description of the process for producing same are discussed in greater detail hereinbelow and in the Examples.

The silyl group containing diallyl phthalate type hardening compounds of the present invention are easily produced by reacting a hydrosilane compound represented by the formula:

wherein $R_1$ is a monovalent hydrocarbn group having 1 to 10 carbon atoms, such as alkyl, aryl and aralkyl groups; X is a group selected from the group consisting of halogen, alkoxy, acyloxy, aminoxy, phenoxy, thioalkoxy and amino groups; and "a" is an integer 0, 1 or 2; with a diallyl phthalate compound having a molecular weight of between 250 to 20,000 which is a monomer having carbon-carbon double bonds or a diallyl phthalate prepolymer in the presence of a catalyst comprising Group VIII transition metals.

The hydrosilane compounds used in the present invention have the following general formula:

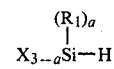

wherein $R_1$, X, and "a" each has the meaning as described above.

Examples of hydrosilane compounds included in this general formula include halogenosilanes such as trichlorosilane, methyl dichlorosilane, dimethyl chlorosilane or phenyl dichlorosilane; alkoxysilanes such as trimethoxysilane, triethoxysilane, methyl diethoxysilane, methyl dimethoxysilane or phenyl dimethoxysilane; acyloxysilanes such as triacetoxysilane, methyl diacetoxysilane or phenyl diacetoxysilane, and various kinds of silanes such as triaminoxysilane, methyl diaminoxysilane and methyl diaminosilane.

Although the hydrosilane compounds can be used in a suitable amount based on the carbon-carbon double bond included in the dailly phthalate monomers or prepolymers, use of 0.5 to 2 times by mol is preferred. Although it is preferred to use silanes in the amounts above listed, it is possible to use larger amounts; however, in that case, the larger amounts are only recovered as unreacted hydrosilanes. Furthermore, as the hydrosilane compounds in the present invention, halogenosilanes having high reactivity and which are inexpensive as raw materials, can be readily used.

Although the silyl group containing diallyl phthalate type hardening compounds obtained from using halogenosilanes harden rapidly at normal temperature with generation of hydrogen chloride when exposed to the atmosphere, they can be practically used for only limited uses because of problems of stimulative odor or corrosion by hydrogen chloride. Accordingly, it is preferred to convert continuously the halogen functional groups into other hydrolyzable functional groups.

As the hydrolyzable functional groups, there are alkoxy groups acyloxy groups, aminoxy groups, phenoxy groups, thioalkoxy groups and amino groups.

As methods of converting the halogen functional groups into these hydrolyzable functional groups, there are those which comprise reacting the halogen functional groups with (1) alcohols or phenols such as methanol, ethanol, 2-methoxyethanol, sec-butanol, tert-butanol or phenol; (2) alkali metal salts of alcohols or phenols: or (3) alkyl orthoformates such as methyl orthoformate or ethyl orthoformate.

As methods of converting into acyloxy groups, there are those which comprise reacting the halogen functional group with (1) carboxylic acids such as acetic acid, propionic acid or benzoic acid; or (2) alkali metal salts of carboxylic acids.

As methods of converting into aminoxy groups, there are those which comprise reacting the halogen functional group with (1) hydroxylamines such as N,N-dimethyl hydroxylamine, N,N-diethyl hydroxylamine, N,N-methylphenyl hydroxylamine or N-hydroxypyrrolidine; or (2) alkali metal salts of hydroxylamines.

As methods of converting into amino groups, there are those which comprise reacting the halogen functional group with (1) primary or secondary amines such as N,N-dimethylamine, N,N-methylphenylamine or pyrrolidine; or (2) alkali metal salts of primary or secondary amines.

As methods of converting into thioalkoxy groups, there are those which comprise reacting the halogen functional group with (1) thioalcohols or thiophenols such as ethyl mercaptan or thiophenols; or (2) alkali metal salts of thioalcohols or thiophenols.

Concerning silyl groups introduced into the diallyl phthalate or diallyl phthalate prepolymers by hydrosilylation reactions, not only the halogen functional groups are converted into other hydrolyzable substituents but also other groups such as alkoxy groups or acyloxy groups may be converted, if necessary, into hydrolyzable groups such as amino groups or aminoxy groups. A preferred reaction temperature for converting the hydrolyzable functional groups on the silyl groups introduced directly by such hydrosilylation reactions into other hydrolyzable functional groups is within the range of 50° to 150° C. Furthermore, although these conversion reaction may be carried out with or without use of solvents, inert solvents such as ethers, hydrocarbons or acetates are preferred in the event solvents are used.

As diallyl phthalate monomers and prepolymers used in the process of this invention, there is no limitation, and available diallyl phthalate monomers, diallyl isophthalate monomers and prepolymers having molecular weight of 250 to 20,000 may be used. In case the diallyl phthalate prepolymer used is solid, it is convenient to carry out the hydrosilylation reaction as a solution in benzene, toluene, dioxane, ethyl acetate, tetrahydrofuran, chloroform or dichloroethane.

In the present invention, a transition metal complex catalyst is preferred for use in a stage of reacting the hydroxilane compound with the carbon-carbon double bond. As the transition metal complex catalyst, complex compounds of Group VIII transition metal selected from the group consisting of platinum, rhodium, cobalt, palladium and nickel are effectively used.

This hydrosilylation reaction is carried out at a suitable temperature within the range of 50° to 150° C. and for a time within the range of from 1 to 3 hours.

The diallyl phthalate compound containing silyl group of of the present invention, hardens by forming a network structure at room temperature when it is exposed to the atmosphere. Since hardening rate, in this case, changes with temperature of the atmosphere, relative humidity and species of hydrolyzable group, it is necessary to sufficiently consider the species of the hydrolyzable group when used.

In carrying out hardening of the diallyl phthalate containing silyl group of the present invention, a hardening accelerator may be used or not used. In case a hardening accelerator is used it is effective to use alkyl titanates, metal salts of carboxylic acids such as tin octylate or dibutyl tin laurate; amines such as dibutylamine-2-hexoate; and other acid catalysts and basic catalysts. These hardening accelerators are preferred to be used in an amount of 0.001 to 10% by weight used on said resins.

The silyl group containing diallyl phthalate type resins of the present invention are useful as adhesives. As shown in the Examples, it is possible to carry out quick adhesion of various items at room temperature. On the other hand, the silyl group containing diallyl phthalate type resins of the present invention harden quickly to form excellent coating films when exposed to the atmosphere. The resulting coating films are shown in the examples.

Various fillers and pigments may be incorporated into the resins of the present invention. As fillers and pigments, there are various kinds of silica, calcium carbonate, magnesium carbonate titanium oxide, iron oxide and glass fibers. Thus, they are not only applied to the above described use, but also are useful as coating compositions for buildings, aircrafts and cars, sealing compositions and agents for surface treatment of various inorganic materials.

In the following, actual examples are set forth to illustrate the invention.

EXAMPLE 1

30 g of diallyl phthalate, 0.000001 g of chloroplatinate and 30 g of methyl dichlorosilane are put into a flask, and the reaction is carried out at 90° C. for 3 hours. After the reaction, 20 ml of ethanol and 20 ml of ethyl orthoformate are added thereto and the mixture is stirred at room temperature for 1 hour. By removing a part, having a low boiling point, under reduced pressure, silyl group containing diallyl phthalate resin was obtained.

Addition of the silyl group to the carbon-carbon double bond has been ascertained by observing the infrared absorption spectrum of diallyl phthalate. Namely, although the absorption of 1648 cm$^{-1}$ by the carbon-carbon double bond is existent in the infrared spectrum before the reaction, this absorption disappears and new absorption appears in the range of 750 to 950 cm$^{-1}$ after the hydrosilylation reaction.

When the resulting resin is exposed to the atmosphere by adding 1% by weight of dibutyl tin laurate, it becomes a tack free state after about 30 minutes and quickly hardens. The infrared absorption spectrum is depicted in FIG. 1.

EXAMPLE 2

100 g of diallyl phthalate prepolymer (Tradename: DapL, produced by Osaka Soda Company, iodine value, about 80), 0.00001 g of chloroplatinate and 1 g of hydroquinone were dissolved in 100 ml of toluene. To this solution 35 ml of methyl diethoxysilane was added, and the reaction was carried out at 90° C. for 3 hours.

In the infrared spectrum of the resulting resin, absorption by the carbon-carbon double bond existent in the starting raw material disappeared. Further, when iodine value of the resulting resin was measured, it was less than 4, which meant that more than 9% of the double bonds in the raw material was reacted.

When this solution of the reaction product in toluene was exposed to the air, the reaction product became a tack free state after about 30 minutes and hardened.

EXAMPLE 3

10 g of diallyl phthalate prepolymer (Trade name Dap L, produced by Osaka Soda Company, iodine value, about 60) was dissolved in 10 g of ethyl acetate. To this solution, 0.05 g of hydroquinone was added as a radical polymerization inhibitor. Further, 0.00001 g of chloroplatinate and 2.9 ml of methyl dichlorosilane were added thereto, and the reaction was carried out at 80° C. for 3 hours. The resulting product was processed with ethanol and ethyl orthoformate by the same manner as in Example 1 to convert the halogen group on silicon into an ethoxy group.

In the resulting solution, absorption of 1648 cm$^{-1}$ or so by the carbon-carbon double bond disappears completely, which means addition of hydrosilane. This is supported by the fact that the iodine value of the resulting resin is less than 5.

EXAMPLE 4

20 g diallyl phthalate prepolymer (same as used in Example 3) was dissolved in 20 g of ethyl acetate, and 0.1 g of hydroquinone was added thereto. To this solution, 0.00002 g of chloroplatinate and 5.8 ml of methyl diethoxysilane were added and the reaction was carried out at 90° C. for 3 hours, by which a resin having the same infrared absorption spectrum as in Example 3, was obtained.

When the resin was exposed to the atmosphere by adding 1% by weight of dibutyl tin maleate to this solution, it became a tack free state within 5 minutes.

EXAMPLE 5 (Example of adhesive)

Solutions of silicon group containing diallyl phthalate resins obtained in Examples 2 and 3 were applied to vinyl chloride plates having 2.5 cm×2.5 cm size, and a pressure of between 0.2 to 0.4 kg/cm$^2$ was applied to the plates in a superposed state by means of clamps. Drying was carried out at room temperature for 24 to 48 hours. The thickness of the resin after drying was between 0.02 and 0.05 mm. Tensile shearing strength of these laminates were as follows:

| Resin | Drying Time | Tensile Shearing Strength |
| --- | --- | --- |
| Example 2 | 24 hours | 8.4 kg/cm$^2$ |
| Example 3 | 48 hours | 21.2 kg/cm$^2$ |

Solutions of resins obtained in Examples 2 and 3 were applied to mild steel plates and allowed to stand at room temperature. After hardening, film thickness was 0.06 mm and 0.18 respectively. The properties of the resulting coating film were as follows:

| Resin | Tack free time | Leaving Time | Hardness of coating Film |
| --- | --- | --- | --- |
| Ex. 2 | 30 min | 48 hours | H-2H |
| Ex. 3 | 10 min | 48 hours | 2H-3H |

The foregoing description is illustrative of the principles of the invention. Numerous variations and modifications thereof would be apparent to the worker skilled in the art. All such variations and modifications are to be considered to be within the spirit and scope of the invention

What is claimed is:

1. A curable diallyl phthalate compound produced by a process wherein diallyl phthalate monomer or diallyl phthalate prepolymer having a molecular weight of 20,000 or less, is reacted with a hydrosilane compound represented by the formula:

$$H \cdot \underset{\underset{\displaystyle }{|}}{Si}X_{3-a}^{(R_1)_a}$$

wherein R$_1$ is a monovalent hydrocarbon group having 1 to 10 carbon atoms; X is a group selected from the group consisting of halogen, alkoxy, acryloxy, aminoxy, phenoxy, thioalkoxy and amino groups; and a is an integer 0, 1 or 2; at a temperature of between 50° and 150° C.

* * * * *